(12) United States Patent
Chu et al.

(10) Patent No.: US 7,306,844 B2
(45) Date of Patent: Dec. 11, 2007

(54) LABELS AND LABELING PROCESS

(75) Inventors: Chia-Hsi Chu, Arcadia, CA (US);
Zhisong Huang, San Dimas, CA (US);
Kai Li, Diamond Bar, CA (US);
Xing-Ya Li, San Gabriel, CA (US);
Prakash Mallya, Sierra Madre, CA (US); Thomas E. Selleny, Concord, OH (US)

(73) Assignee: Avery Dennison Corporation, Pasadena, CA (US)

( * ) Notice: Subject to any disclaimer, the term of this patent is extended or adjusted under 35 U.S.C. 154(b) by 80 days.

(21) Appl. No.: 11/053,457

(22) Filed: Feb. 8, 2005

(65) Prior Publication Data

US 2005/0202239 A1    Sep. 15, 2005

Related U.S. Application Data

(60) Provisional application No. 60/552,044, filed on Mar. 10, 2004.

(51) Int. Cl.
*B32B 7/12* (2006.01)
*B32B 15/04* (2006.01)

(52) U.S. Cl. ............ 428/350; 428/354; 428/343; 428/40.1; 428/317.7

(58) Field of Classification Search .......... 428/350, 428/354, 343, 40.1, 317.7
See application file for complete search history.

(56) References Cited

U.S. PATENT DOCUMENTS

| | | | |
|---|---|---|---|
| 2,782,949 A | 2/1957 | Marks | 216/62 |
| 3,939,108 A * | 2/1976 | Sirota et al. | 524/52 |
| 4,336,166 A * | 6/1982 | Penczuk et al. | 524/53 |
| 4,464,202 A * | 8/1984 | Andres et al. | 106/140.3 |
| 4,608,284 A * | 8/1986 | Roales | 428/34.9 |
| 5,186,782 A | 2/1993 | Freedman | 156/244.11 |
| 5,564,843 A | 10/1996 | Kawaguchi | 400/208 |
| 5,565,268 A | 10/1996 | Zajaczkowski | 428/355 |
| 5,569,515 A | 10/1996 | Rice, II et al. | 428/40.5 |
| 5,676,785 A | 10/1997 | Samonides | 156/244.11 |
| 5,686,180 A | 11/1997 | Rivlin et al. | 428/350 |
| 5,723,190 A | 3/1998 | Osaka | 428/40.1 |
| 5,789,123 A | 8/1998 | Cleckner et al. | 430/18 |
| 5,855,722 A | 1/1999 | Osaka | 156/277 |
| 5,871,829 A | 2/1999 | Nishizawa et al. | 428/40.1 |
| 6,051,311 A | 4/2000 | Osaka | 428/352 |
| 6,106,982 A * | 8/2000 | Mientus et al. | 430/14 |
| 6,129,965 A | 10/2000 | Langan | 428/41.8 |
| 6,150,013 A | 11/2000 | Balaji et al. | 428/220 |
| 6,210,524 B1 | 4/2001 | Josephy | 156/344 |
| 6,242,510 B1 | 6/2001 | Killey | 523/204 |
| 6,270,871 B1 | 8/2001 | Scholz et al. | 428/40.1 |
| 6,290,119 B1 | 9/2001 | Reese et al. | 229/4.5 |
| 6,306,242 B1 | 10/2001 | Dronzek | 156/308.8 |
| 6,489,387 B2 | 12/2002 | Mallya et al. | 524/394 |
| 6,503,620 B1 | 1/2003 | Xie et al. | 428/354 |
| 6,517,664 B1 | 2/2003 | Dronzek, Jr. | 156/328 |
| 6,537,651 B2 | 3/2003 | Geurtsen et al. | 428/202 |
| 6,541,098 B2 | 4/2003 | Venkatasanthanam et al. | 428/161 |
| 6,663,746 B2 | 12/2003 | Dronzek | 156/306.3 |
| 2001/0018125 A1 | 8/2001 | Shibuya et al. | 428/352 |
| 2003/0064178 A1 | 4/2003 | Smith et al. | 428/34.4 |
| 2003/0072901 A1 | 4/2003 | Dronzek, Jr. | 428/34.1 |
| 2003/0099827 A1 | 5/2003 | Shih et al. | 428/343 |
| 2003/0102080 A1 | 6/2003 | Mallik | 156/325 |
| 2003/0113500 A1 | 6/2003 | Ingerslew et al. | 428/42.3 |
| 2003/0122371 A1 | 7/2003 | Rochford et al. | 283/101 |
| 2003/0157313 A1 | 8/2003 | Shibuya et al. | 428/314.4 |
| 2005/0106121 A1 * | 5/2005 | Hartman et al. | 424/78.27 |
| 2005/0202239 A1 * | 9/2005 | Chu et al. | 428/355 CP |

FOREIGN PATENT DOCUMENTS

| | | |
|---|---|---|
| WO | 99/19412 | 4/1999 |
| WO | 00/13887 | 3/2000 |
| WO | 00/13888 | 3/2000 |
| WO | 00/61364 | 10/2000 |
| WO | 01/03950 | 1/2001 |
| WO | 01/32796 | 5/2001 |
| WO | 01/70484 | 9/2001 |
| WO | 02/074874 | 9/2002 |
| WO | 03/002839 | 1/2003 |
| WO | 03/010057 | 2/2003 |
| WO | 03/029378 | 4/2003 |

OTHER PUBLICATIONS

PCT/US05/03843; PCT International Search Report mailed Jul. 7, 2006.

* cited by examiner

*Primary Examiner*—Daniel Zirker
(74) *Attorney, Agent, or Firm*—Renner, Otto, Boisselle & Sklar

(57) ABSTRACT

This invention relates to labels. In one embodiment, the labels comprise (A) a polymer film comprising a styrenic polymer, said film having an upper surface and a lower surface, and an MVTR of from about 15 to about 150 g/m²/day, and (B) a water-based adhesive in contact with the lower surface of the film. These labels can be bonded to substrates of glass, plastic or metal using the water based adhesive.

36 Claims, No Drawings

LABELS AND LABELING PROCESS

CROSS REFERENCE TO RELATED APPLICATION

This application claims the priority of provisional application Ser. No. 60/552,044 filed Mar. 10, 2004. The disclosure of this provisional application is hereby incorporated by reference.

TECHNICAL FIELD OF THE INVENTION

This invention relates to labels, and more particularly to polymeric film labels, and to a process of applying polymeric film labels to containers using a water-based adhesive.

BACKGROUND OF THE INVENTION

It is common practice to apply labels to containers or bottles formed from polymers or glass. Such containers and bottles are available in a wide variety of shapes and sizes for holding many different types of materials such as detergents, chemicals, motor oil, soft drinks, alcoholic beverages, etc. The labels provide information containing the contents of the container and other information such as the supplier of the container or the contents of the container.

One widely used and well known labeling technique uses a water-based adhesive, and this technique is commonly known as water-based "cold glue labeling" or "patch labeling". In such labeling method, a water-based adhesive is applied to the label, which is usually held in a stack in a magazine, the label is then transferred to a transfer means, and the label is subsequently applied to the relevant container. The use of water-based adhesives requires that drying must take place by evaporation of the water. Accordingly, the early practice in this technology, which is still prevalent today, employed the use of labels manufactured from paper substrates which have a high vapor transmission rate "MVTR" so that drying of the adhesive after the label is applied to the container is not hindered. With paper labels, drying takes place in a few hours after application of the label to the container. The use of paper in conjunction with water-based adhesives, while providing for a quick drying label, results in other problems known in the industry such as poor tear resistance, moisture sensitivity, relatively poor durability, wrinkling, creasing, etc. Furthermore, it is becoming more common to recycle plastic and glass containers, and if a paper label has been utilized, it is not possible to recycle the container without removing the label prior to recycling.

Polymeric film materials and film facestocks have been described for use as labels in various fields, but their use in the labeling applications of the type discussed above in which a water-based adhesive is utilized has been limited because with polymeric films which are essentially non-permeable to water, it is very difficult for the moisture vapors to escape which is necessary for an accelerated drying process. The slow drying of the water-based adhesive when polymer films and facestocks are utilized in the labels also increases the time necessary to obtain a satisfactory bond of the label to the container. This often results in label movement during handling and storage, and visible bubbling effects at the surface of the label which are aesthetically undesirable. Bubbling has been observed to occur in particular at elevated temperatures such as exists in the summer.

Clear polymeric labels are increasingly desired, since they provide a no-label look to decorated glass and plastic containers. Paper labels block the visibility of the container and/or the contents in the container. Clear labels enhance the visual aesthetics of the container, and therefore the product, and are growing much faster than paper labels in the package decoration market as consumer product companies are continuously trying to upgrade the appearance of their products on store shelves.

Accordingly, it would be desirable to produce labels, in particular, polymeric film labels which can be applied to containers using a water-based adhesive wherein the adhesive dries and the label bonds to the container within an acceptable period of time.

SUMMARY OF THE EMBODIMENTS

In one embodiment, this invention relates to a label which comprises:
(A) a polymer film comprising a styrenic polymer, said film having an upper surface and a lower surface, and an MVTR of from about 15 to about 150 $g/m^2/day$, and
(B) a water-based adhesive in contact with the lower surface of the film.

In another embodiment, this invention relates to a label which comprises:
(A) an oriented film comprising a styrenic polymer, said film having an upper surface and a lower surface, and an MVTR of from about 15 to about 90 $g/m^2/day$, and
(B) a water-based adhesive in contact with the lower surface of the facestock.

In addition, the present invention relates to a method of labeling substrates utilizing the above described labels.

DESCRIPTION OF THE INVENTION

The term "overlies" and cognate terms such as overlying and the like, when referring to the relationship of one or a first layer relative to another or a second layer, refers to the fact that the first layer partially or completely overlies the second layer. The first layer overlying the second layer may or may not be in contact with the second layer. For example, one or more additional layers may be positioned between the first and the second layer. The term "underlies" and cognate terms such as "underlying" and the like have similar meanings except that the first layer partially or completely lies under, rather than over the second layer.

The term "transparent" when referring to one or more layers of the label film means that any material beneath such layers can be seen through such layers. In reference to the use of "transparent" or "clear" labels applied to clear containers, such as beer bottles, the bottle and the beer within the bottle are visible through the label.

The term "clear" when referring to one or more layers of the label or to the label itself means the opacity of the layers or label is less than about 5%, and the layers or the label has a haze of less than about 10%. Opacity is measured in accordance with TAPPI Test T425 os, and haze is measured in accordance with ASTM Test Method D-1003.

In one embodiment, the labels of the present invention comprise:
(A) a polymer film comprising a styrenic polymer, said film having an upper surface and a lower surface, and an MVTR of from about 15 to about 150 $g/m^2/day$, and
(B) a water-based adhesive in contact with the lower surface of the film.

The polymer films utilized in the labels of the present invention may be monolayer films or multilayer films. The multilayer films may comprise from 2 or more layers. The styrenic polymer films may be oriented or not oriented, and when oriented, the films may be monoaxially oriented or biaxially oriented. Depending on the end use of the label, the styrenic polymer film may be transparent, tinted, or opaque. Opaque or tinted films generally comprise a styrenic polymer as described below and one or more pigments to provide one or more layers of a multilayer film with the desired color. Pigments useful for this purpose are well known in the art. For example, white films can be prepared by introducing titanium dioxide and other white pigments into the polymer. Carbon black may be introduced to provide a black or grey film.

A wide variety of styrenic polymers can be utilized in the films (referred to herein as "styrenic films" or "styrenic polymer films") used in the labels of the present invention. The term styrenic polymer, as used in this application, includes styrenic polymers, styrenic copolymers and blends of styrenic polymers and/or copolymers with other polymers or copolymers. In one embodiment, the styrenic polymers include homopolymers as well as copolymers of styrene and substituted styrenes. As used herein, the term "copolymers" is intended to include terpolymers. Examples of useful substituted styrenes include alpha-methylstyrene, beta-methystyrene, o-methylstyrene, p-methylstyrene, p-t-butyl-styrene, 1,3-dimethylstyrene, p-isopropyl styrene, 2,3-dimethylstyrene, o-chlorostyrene, p-chlorostyrene, o-bromostyrene, 2-chloro-4-methylstyrene, etc.

Examples of types of styrenic polymers useful in the present invention include: polystyrene (PS), styrene butadiene copolymers (SB), styrene-isoprene copolymers (SI) styrene-maleic anhydride copolymers (SMA), styrene-methylmethacrylate copolymers (SMMA), acrylonitrile-butene-styrene copolymers (ABS), etc. Specific examples of useful styrenic polymers include high styrene content styrene-butadiene copolymer (e.g., K-Resin SBC, Chevron Phillipps Chemical); poly(styrene-co-methylmethacrylate (PSMMA); poly(styrene-co-ethyl methacrylate (PSEMA); polystyrene-acrylate resins such as are available from Eastman, Libra Lindau, Morton International, Ortec Inc., etc.; poly(styrene-co-acrylonitrile) (PSAN) from Luran; poly(styrene-co-methacrylontrile) (PSMAN); poly(styrene-co-maleic anhydride (PSMA) such as Dylark 232 from Arco Chemical containing 9% maleic anhydride; poly(styrene co-alpha-methyl styrene (PSAMS); poly(styrene-co-allyl alcohol); poly(styrene-co-pyrollidone); poly(styrene-co-ethylene); terpolymers of styrene, maleic anhydride and methyl methacrylate; terpolymers of styrene, acrylontrile and methyl methacrylate; terpolymers of styrene, butadiene and methyl methacrylate; terpolymers of styrene, acrylonitrile and butadiene (ABS), terpolymers of styrene butadiene styrene (SBS) terpolymers of styrene-isoprene-styrene (SIS), etc.

Blends of styrenic polymers and blends of styrenic polymers with other polymers may also be utilized in the films used in the labels of the invention. Examples of styrenic polymer blends include: polystyrene/K-Resin SBC blends; polystyrene/poly(styrene-co-methylmethacrylate) blends; K-Resin SBC/poly(styrene co-methylmethacrylate) blends; polystyrene/PSAN blends; polystyrene/styrene maleic anhydride copolymer blends such as those available from Bayer Corp., Plastics Division, Monsanto, Sartomer, Ultra Additives, etc.; PSAN/PMMA blends; SAN/styrene maleic anhydride random copolymer blends; polystyrene/poly/acetoxy styrene or poly-parahydroxy styrene blends such as available from Hoechst Celanese; polystyrene/sulfonated polystyrene blends; polystyrene/polyamide blends; polystyrene/polyvinyl methyl ether blends; polystyrene/PPO blends; polystyrene/polycarbonate blends; polystyrene/polylactic acid (PLA) blends; etc. In one embodiment, the styrenic polymer blends generally will contain at least 30% or at least 50% of the styrenic polymer.

The styrenic polymer films useful in the labels of the present invention may be cavitated and/or contain inorganic fillers and other organic and inorganic additives to provide desired properties such as appearance properties, durability and processing characteristics. Nucleating agents may be added to increase crystallinity and thereby increase stiffness. Examples of useful additives include calcium carbonate, titanium dioxide, metal particles, fibers, flame retardants, antioxidant compounds, heat stabilizers, light stabilizers, ultraviolet light stabilizers, antiblocking agents, processing aides, acid acceptors, etc.

The styrenic polymers and styrenic polymer blends are selected to provide a continuous polymer film in the labels of the present invention with the desired properties such as improved tensile strength, elongation, impact strength, tear resistance, and optics, (haze and gloss). The styrenic polymers utilized in the present invention also are selected to provide a film having a moisture vapor transmission rate (MVTR) of from about 15 to about 150 $g/m^2/day$. In another embodiment, the styrenic polymers are selected to provide a film having an MVTR of from about 25 or 30 to about 90 $g/m^2/day$. In general, the MVTR of the films useful in the present invention will be sufficiently high to allow the water based glue to dry within a reasonable period of time (3-7 days under ambient conditions), but the MVTR should not be so high as to reduce the water resistance of the film to an extent that the dried label is not sufficiently resistant to water. The MVTR of the films of the present invention is measured by the PERMATRAN-W 3/31 (MG) instrument in accordance with ASTM Method F 1249. The instrument is operated at a temperature of 25° C. and at 85% relative humidity on both sides of the film. The permeant is water vapor, and the flow rate of the nitrogen gas is 10 SCCM. The sample is subjected to a one hour conditioning period, and the examination time for each cycle is 60 minutes.

In one embodiment, it is desired that the styrenic films utilized in the labels of the present invention are characterized as having an oxygen transmission rate (OTR) of at least 1000 $cc/m^2/day$ when measured at a temperature of 23° C. at 50% relative humidity. The oxygen transmission rate of the films of the present invention is determined utilizing the OX-TRAN 2/20 (ML system) instrument in accordance with ASTM Method F 1927. The permeant is oxygen, and the flow rate of oxygen is 20 SCCM. The sample is subject to a one hour conditioning period, and the examination time for each cycle is 60 minutes.

The thickness of the styrenic polymer film may range from about 0.1 to about 10 mils, or from about 1 to about 5 mils. In one embodiment, the thickness of the film is from about 1 to about 3 mils. As mentioned above, the styrenic films utilized in the labels of the present invention may comprise a single layer, or the film can be a multilayer film of two or more adjacent layers provided that the MVTR of the multilayer film is from about 15 to about 150 $g/m^2/day$. In one embodiment, the film is a two layer film wherein the upper layer comprises a styrenic polymer, and the second layer comprise a polymer film having an MVTR which is greater than the MVTR of the first styrenic polymer layer. When the film is a multilayer film, the additional layer(s) may comprise any of a variety of suitable polymers including styrenic polymers which are different from the styrenic polymer utilized in the first or upper layer.

In one embodiment, the polymers used to form the additional layers should be high MVTR polymers. Examples of high MVTR polymers useful for the additional layer(s), in addition to the styrenic polymers described above, include polylactic acid (PLA), copolyesters such as B1O GP resin from Eastman Chemicals, Copolyether-polyesters such as Hytrel resin from DuPont, acrylic copolymers such as Plexiglas resin from Ato Fina, polyether polyurethane resin such as Estane 58L45 from Noveon; polyamide resins such as Aegis from Honeywell etc. The adhesion of the styrenic layer in the multilayer film to a second layer can be improved by including a tie layer between the upper styrenic layer and the lower film layer as known in the art. In one embodiment, the material selected for the tie layer will also have a high MVTR. Examples of useful tie layer materials are the Bynel adhesive resins from DuPont. For example, Bynel E418 is an anhydride modified EVA copolymer.

The monolayer and multilayer films useful in the labels can be manufactured by those processes known to those skilled in the art such as by casting or extrusion. In one embodiment, the films are manufactured by polymer extrusion or coextrusion processes. The extrudate or coextrudate of polymeric film materials is formed by simultaneous extrusion from a suitable known type of extrusion or co-extrusion die, and in the case of a coextrudate, the layers are adhered to each other in a permanently combined state to provide a unitary coextrudate.

In addition to coextrusion, the multilayer films useful in the present invention may be prepared by extrusion of a continuous film to form one layer followed by the application of one or more additional layers on the extruded layer by extrusion of one or more additional layers; by lamination of a preformed polymer film to a preformed functional film; or by deposition of additional layers on the preformed film from an emulsion or solution of a polymeric film forming material.

The MVTR of the final styrenic films (monolayer or multilayer) is a function of the materials used, film thickness and processing. Accordingly, thin films are particularly useful. If a tie layer is used in a multilayer film, the tie layer should be as thin as possible such as about 0.05 to about 0.1 or 0.5 mil. In one embodiment, it is desirable for the upper styrenic layer of a multilayer film to be around 0.1 to 1 mil thick to provide higher MVTR.

In one embodiment, the films used in the present invention are not oriented. That is, the films are not subjected to a hot-stretching and annealing step. In other embodiments, the films contained in the labels used in the present invention are oriented in the machine direction (uniaxially) or in both the machine and cross directions (biaxially) by hot-stretching and annealing by techniques well known to those skilled in the art. For example, the films may be hot-stretched in the machine direction only at a ratio of at least 2:1 and more often, at a ratio of between about 2:1 to about 9:1. After the film has been hot stretched, it is generally passed over annealing rolls where the film is annealed or heat-set at temperatures in the range of from about 50° C., more often 100° C. to about 150° C., followed by cooling. In another embodiment, the film is biaxially oriented. It is desirable that the films exhibit a degree of stiffness in the machine direction and the cross direction to facilitate handling, printing and dispensing. Thus, in one embodiment, the stiffness in the machine direction, and the cross direction should be at least about 5 Gurley (mg), as determined using TAPPI Test T543 pm and in a further embodiment the Gurley stiffnesses in both directions are within about 5 Gurley units (sometimes referred to as a balanced stiffness). In another embodiment, the films used in the labels of the invention have a Gurley stiffness of from about 5 to about 30 mg in the machine or horizontal direction, and from about 10 to about 40 mg in the cross or vertical direction.

The surface energy of both surfaces of the films can be enhanced by treatments such as corona discharge, flame, plasma, etc. to provide the surfaces with desirable properties such as improved printability, improved adhesion to subsequently applied layers (e.g., water-based glues), etc. Procedures for corona treating and flame treating of polymer films are well known to those skilled in the art. In one embodiment, a facestock is corona discharge treated on the upper surface and flame treated on the lower surface.

The labels the present invention may, and generally do, comprise one or more print layers. The print layer may be an ink or graphics layer, and the print layer may be a mono-colored or multi-colored print layer depending on the printed message and/or the intended pictorial design. These include, variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks. Examples of these inks include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment the film can be printed with water based and UV inks on narrow web presses equipped with a sheeter on the end. In another embodiment, the print layer comprises a polyester/vinyl ink, a polyamide ink, an acrylic ink and/or a polyester ink. The print layer is formed in the conventional manner by depositing, by gravure printing or the like, an ink composition comprising a resin of the type described above, a suitable pigment or dye and one or more suitable volatile solvents onto one or more desired areas of the metal layer. After application of the ink composition, the volatile solvent component(s) of the ink composition evaporate(s), leaving only the non-volatile ink components to form the print layer. An example of a suitable resin for use in forming a polyester ink is ViTEL® 2700 (Bostik-Findley)—a copolyester resin having a high tensile strength (7000 psi) and a low elongation (4% elongation). A ViTEL® 2700-based polyester ink composition may comprise 18% ViTEL® 2700, 6% pigment, 30.4% n-propyl acetate (NP Ac) and 45.6% toluene. As can readily be appreciated, ViTEL® 2700 is, by no means, the only polyester resin that may be used to formulate a polyester ink, and solvent systems, other than an NP Ac/toluene system, may he suitable for use with ViTEL® 2700, as well as with other polyester resins. An example of a polyester adhesive composition comprises 10.70%, by weight, ViTEL® 2300 polyester resin; 10.70%, by weight, ViTEL® 2700 polyester resin; 1.1%, by weight, BENZOFLEX S404 plasticizer; 1.1%, by weight, HULS 512 adhesion promoter; 19.20%, by weight, toluene; and 57.10%, by weight, methyl ethyl ketone.

The adhesion of the ink to the surface of the styrenic film can be improved, if necessary, by techniques well known to those skilled in the art. For example, as mentioned above, an ink primer or other ink adhesion promoter can be applied to the styrenic film before application of the ink. Alternatively the surface of the styrenic film can be corona treated or flame treated to improve the adhesion of the ink to the facestock layer.

Useful ink primers may be transparent or opaque and the primers may be solvent based or water-based. In one embodiment, the primers are radiation curable (e.g., UV). The ink primer is typically comprised of a lacquer and a diluent. The lacquer is typically comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the ink primer, the selection of such viscosity being within the skill of the art. An example of a ink primer material that can be used is CLB04275F-Prokote Primer (a product of Sun Chemical Corporation identified as a solvent based primer useful with inks and coatings). The ink primer layer may have a thickness of from about 1 to about 4 microns or from about 1.5 to about 3 microns.

A high MVTR transparent polymer protective topcoat or overcoat layer may be present in the labels of the invention. In one embodiment, a transparent topcoat or overcoat layer overlies the print layer. The protective topcoat or overcoat layer provides desirable properties to the label before and after the label is affixed to a substrate such as a container. The presence of a transparent topcoat layer over the print layer may, in some embodiments provides additional properties such as antistatic properties stiffness and/or weatherability, and the topcoat may protect the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g, UV), chemically resistant, thermally resistant thereby protecting the label and, particularly the print layer from degradation from such causes. The protective overcoat may also contain antistatic agents, or anti-block agents to provide for easier handling when the labels are being applied to containers at high speeds. The protective topcoat constructions of the labels used in the invention may also be selected to provide labels useful on containers subjected to subsequent liquid processing such as bottle washing/rinsing, filling and pasteurization, or liquid immersion (e.g., ice bath) without displaying adverse consequences such as label lifting or hazing. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 0.5 to about 5 microns, and in one embodiment about 0.5 to about 1 micron. Examples of the topcoat layers are described in U.S. Pat. No. 6,106,982 which is incorporated herein by reference. In one embodiment, the materials used to form the topcoat layer are those generally characterized as having a high MVTR.

The protective layer may comprise polyesters, polyurethanes, polyacryls, polymethacryls, vinyl acetate homopolymers, co- or terpolymers, ionomers, and mixtures thereof.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin 123, (bis-(1-octyloxy-2,2,6,6-tetramethyl-4-piperidinyl)sebacate; Tinuvin 622, (a dimethyl succinate polymer with 4-hydroxy-2,2,6,6-tetramethyl-1-piperidineethanol); Tinuvin 770 (bis-(2,2,6,6-tetramethyl-4-piperidinyl)-sebacate); and Tinuvin 783. Also useful light stabilizers are the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The transparent protective layer may contain an antioxidant. Any antioxidant useful in making thermoplastic films can be used. These include the hindered phenols and the organo phosphites. Examples include those available from Ciba Specialty Chemical under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

The transparent protective layer may contain a metal deactivator. Any metal deactivator useful in making thermoplastic films can be used. These include the hindered phenol metal deactivators. Examples include those available from Ciba Specialty Chemical under the trade designation Irganox 1024. The concentration of the metal deactivator in the thermoplastic film composition is in the range of up to about 1% by weight, and in one embodiment about 0.2% to about 0.5% by weight.

The water-based adhesives which are useful in the present invention may be any of the water-based adhesives known to be useful for labeling of substrates such as glass, plastics, and metal such as adhesives based on starch, modified starches, casein, synthetic polymers, or blends of starch, modified starches, casein or synthetic polymers. As mentioned above, these water-based adhesives are generally referred to in the art as "cold glues". When the clear no label look is desired, a water based adhesive is selected which provides a clear dry coating. In one embodiment, the cold glues may comprise polymer emulsions or micro-emulsions such as synthetic emulsions, e.g., an emulsion based on acrylic polymers or vinyl acetate polymers and usually copolymers such as vinyl acetate/ethylene or vinyl acetate/maleic acid, and styrene/acrylic copolymers. The water based adhesive also may be an emulsion based on a modified natural latex (e.g., styrene-butadiene rubber, neoprene-butadiene rubber, and acrylate-butadiene rubber). These dispersions or emulsions can optionally be modified by the addition of various synthetic and natural resins and additives such as casein, modified starch, polymers in solution, rosin compounds, rheological agents, etc. which provide specific properties in terms of flow, anchorage, tackiness, speed of drying, clarity, water resistance, etc. In one embodiment, these water-based emulsion adhesives generally will have solids content of at least 40%. The water-based adhesive based on casein or dextrin generally have a lower solids content (20 to 30%). These adhesives often are preferred for polymeric labels and containers made of glass, plastics, and metal. The drying process is assisted when the emulsions contain higher solids contents such as at least 50% and, especially around 60%. Solids content generally does not exceed 65 or 70% by weight.

Some water-based adhesives useful in this invention are described in U.S. Pat. Nos. 3,939,108; 4,336,166; and 4,464,202. The disclosures of water-based adhesives contained in these patents is hereby incorporated by reference. Water-based adhesives useful in the present invention also are available commercially. For example, Findley 242 361M, a casein based labeling adhesive for glass; Henkel BL300, a starch and styrene-maleic anhydride based adhesive for brewery applications; Henkel Optal 10-7006, and Henkel Optal 10-7300 are useful adhesives. The water-based adhesive generally is applied to the lower surface of the styrenic film of the label just prior to application of the label to the substrate (e.g., glass bottle). The adhesive is not dried until the label has been applied to the substrate.

The amount of water-based adhesive which is applied to the lower surface of the styrenic film may range from about 10 to about 60 g/m$^2$ for 100% coverage of the styrenic film. If a grid or other pattern of adhesive is employed, that is, the adhesive layer is not a continuous layer, then the amount of adhesive may be reduced.

The labels of the present invention are useful for labeling of plastic, glass or metal containers or surfaces. The process generally is one wherein the labels (without adhesive) are provided as a stack in a label magazine. A rotating pallet removes adhesive from a rotating adhesive cylinder and applies the adhesive to the lower surface of the styrenic film of the top label in the stack. The label is then transferred to a label transfer drum, on which it is held by means such as vacuum suction and/or grippers. From the transfer drum, the label is applied on its adhesive side to the container. In one embodiment, the adhesive is normally applied to the label at ambient temperature, namely, from about 20 to 30° C.

As noted, conventional labeling systems use a pallet to transfer adhesive from the adhesive cylinder to the label. In conventional systems, the surface of this pallet usually consists of very fine shallow grooves which are continuous across the width. These are designed by the machine builder to aid adhesive pickup. This results in adhesive coverage of at least 75 or 80%, often about 100%. Alternatively, it is possible to provide pallets having a surface configuration chosen in accordance with a pattern of adhesive which is applied to the label. In another embodiment, the pallet has a smooth surface for depositing a smooth surface coating of adhesive. These pallets may be made of conventional materials.

The labels of the present invention may be adhesively applied to a variety of substrates including metal, glass and plastic. In one embodiment, the substrates may be containers for food, drink, or a household product, and these containers may be made of glass, plastic or metal. When it is desired to view the contents of a glass or plastic container through the label, a clear or transparent label is used. Such labels provide the container with the clear "no-label look".

When the labels of the present invention are applied to the substrates as described above with water based adhesives as discusses herein, excellent initial adhesion of the label to the substrate is observed. In some applications, such as when applied to beer bottles, the dried labels must be able to survive being immersed in ice water for from one to three days. After being subjected to the ice water test, the labels should remain bonded to the bottle, should not whiten, and should not slide when pressure is applied to the label.

The following examples illustrate the preparation of the styrenic films useful in preparing the labels of the present invention. The examples are illustrative and are not intended to be limiting in scope. Unless otherwise indicated in the examples, the claims or elsewhere in the written description, temperatures are ambient temperatures or in degrees centigrade, amounts are by weight, and pressures are at or near atmospheric pressure.

EXAMPLE 1

A polystyrene resin (Styron 695, Dow Chemicals) is extruded using a Davis DS 1.75 extruder with a 12 inch die at a melt temperature of 400° F. A stack of 3 chill rolls is used to cast the film. The temperatures from the top roll to the bottom roll are about 125/120/125° F. The line speed is adjusted at 20/30 feet per minute to provide films with a thickness of from 1 to 3 mils.

EXAMPLE 2

A tinted polystyrene resin is compounded using 98% Styron 695 and 2% of colorant which is a mixture composed of 64.4% Clariant HS-100 Sandoplast Yellow G; Clariant HS 310 Sandoplast Red G; and 3.4% Clariant 15-1048 PV Fast Blue BG. A Leistritz MIC/27 twin screw extruder is used in the compounding of the colorants with the polystyrene. The polystyrene resin is fed through the main hopper and the colorants are fed through a side feeder. The twin screw melt temperature is set at 160° C., and the screw speed at 500 rpm. The feed rate (ratio) is controlled by calibrated K-TRON feeders. The extruded strands are pulled through a water quench tank with water temperature at 80° F. The extruded strand is then pelletized for extrusion. A cast film of the tinted polystyrene is extruded by the same procedure as described in Example 1.

EXAMPLE 3

The tinted polystyrene resin as described in Example 2 is extruded using a 6 inch die to make sheets with a thickness of about 15 mils. This sheet is then biaxially oriented with a Bruckner's Laboratory Stretcher "KARA IV" with stretch ratios (the ratio of final stretch length to initial strength) of 3 in the machine direction (MD) and 2 in the cross-web direction (CD). The film orientation is conducted at a temperature of about 140° C.

EXAMPLE 4

The 15-mil tinted polystyrene cast sheet prepared as in Example 3 is biaxially oriented with stretch ratios of 4 in the MD and 3 in the CD under the same conditions as described in Example 3.

EXAMPLE 5

A styrene butadiene copolymer resin (Chevron Phillips Chemical K-Resin DK 11) is extruded utilizing the same procedure described in Example 1. The take up speed is 16 fpm.

EXAMPLE 6

A polymer blend of Styron 695 resin, Bynel E 418 (an anhydride modified EVA compatibilizer from DuPont), and polylactic acid (PLA) from Cargill Dow 4042 D is prepared by dry blending at a weight ratio of 70:10:20. The PLA resin is dried with a desiccant drier over night before processing. The extrusion temperature is set at 390° F., and the extruder speed is 15 rpm. The film line speed is 50 fpm.

EXAMPLE 7

A polymer blend of Styron 695 resin, Bynel E 418 and Hytrel G 3548 (a thermoplastic polyester elastomer based material from DuPont) is prepared by dry blending in a weight ratio of 70:10:20. The Hytrel resin is dried with a desiccant drier overnight before processing. The extrusion procedure is the same as described in Example 6 to form a single layer film.

EXAMPLE 8

A blend of Styron 695 resin with a styrene-butadiene-styrene copolymer (SBS, Kraton D-2122) at a weight ratio of 85:15 is prepared by dry blending. A single layer film is prepared utilizing the same procedure as described in Example 1.

EXAMPLE 9

In this example, a two layer co-extrusion of one layer of Styron 695 resin and a second layer of K-Resin (DK-11) is prepared. Extruder A is a 0.75 inch extruder by Brabender PL 2000, extruder B is a Davis Standard 1.5 inch extruder, and extruder C is a one inch Killion extruder. All three extruder outlets are connected to an adaptor and are fed to a 6 inch die. Styron 695 is charged to extruders A and B, and the K-Resin is charged to extruder C. The melt temperatures are set at 400° F. and the die and adaptor temperatures are set at 420° F.

EXAMPLE 10

A two layer film is prepared by a coextrusion wherein the first layer is Styron 695 resin and the second layer is a blend of Styron 695/Bynel E 418/PLA as prepared in Example 6. The Styron resin is added to extruder A and the blend is added to extruders B and C. Under the same processing conditions as described in Example 9, a two layer film is prepared.

EXAMPLE 11

A three layer film is prepared by coextrusion. The upper styrenic layer comprises K-Resin (DK-11); the intermediate layer (a tie layer) comprises Bynel E 418 and the third layer comprises PLA. The coextrusion process is as described in Example 9. The melt temperatures are set at 390° F., and the ratio of thicknesses of the layers of K-Resin, E 418 and PLA is about 1:0.5:2.

EXAMPLE 12

A 7 mil multilayer film is made by a coextrusion of K-Resin (DK-11), Bynel E 418 and PLA under conditions similar to those described in Example 11. This film is biaxially oriented with a stretching ratio of 2×2 at 140° C.

Some of the properties of the films of examples 1-12 have been determined and are reported in the following Table I. The film of Comparative Example 1 is a biaxially oriented polypropylene film from Exxon Mobil; the film of Comparative Example 2 is a Mylar PET film from DuPont and Comparative Example 3 is a cellophane film from UCB (UCB 600 P 23).

TABLE 1

| | thickness | MVTR g/m²/day | OTR cc/m²/day | Light transmission | Haze | Gurley stiffness | |
|---|---|---|---|---|---|---|---|
| | micron | 25 C., 85% RH | 23 C., 50% RH | % | % | MD | CD |
| Example 1 | 23 | 73 | | 98 | 1 | 3 | 2 |
| Example 2 | 53 | 32 | 1500 | 45 | 6 | 13 | 14 |
| Example 3 | 31 | 60 | | 72 | 3 | | |
| Example 4 | 67 | 28 | | 56 | 4 | 25 | 25 |
| Example 5 | 51 | 29 | 2000 | 96 | 1 | 6 | 3 |
| Example 6 | 50 | 57 | | 57 | 92 | 11 | 8 |
| Example 7 | 50 | 47 | | 76 | 82 | 10 | 9 |
| Example 8 | 72 | 24 | | 88 | 70 | 20 | 15 |
| Example 9 | 50 | 36 | | 95 | 2 | 13 | 11 |
| Example 10 | 50 | 39 | | 84 | 72 | 11 | 8 |
| Example 11 | 48 | 56 | | 94 | 4 | 10 | 7 |
| Example 12 | 29 | 74 | | 95 | 7 | | |
| Comparative Example 1 | 50 | .83 | 900 | 95 | 3 | 11 | 20 |
| Comparative Example 2 | 50 | 5.5 | 36 | 92 | 2 | 23 | 27 |
| Comparative Example 3 | 41 | 305 | 9 | 95 | 2 | | |

As mentioned above, when the labels of the present invention are applied to substrates as described above with water based adhesives, excellent initial adhesion of the label to the substrate is observed. In one embodiment, it is desired that the water based glue used to adhere the label to a substrate dry within a reasonable period of time such as from 3 to 7 days under ambient conditions. It is also desirable that the glue has sufficient water resistance after drying to minimize loss of adhesion and whitening of the label upon prolonged contact with water or iced water. The ability of the adhesive labels of the present invention to dry within a reasonable period of time is determined utilizing the following glue drying test. About 1 mil of cold glue (e.g., Henkel Optal 10-7066) is applied to the film of the label using a Burd Bar. The label is then laminated onto an aluminum panel which is then placed in a weather chamber for 7 days. The initial weights of the panel, film and entire lamination are measured, respectively, and the weight change of the panel laminate is monitored daily. After 7 days, the film is peeled off to allow the glue to be directly exposed to air for another 24 hours, and the panel is again weighed. The final weight, minus panel and film weights, is taken as the dried glue weight and is used in analysis of the glue drying process.

The ability of the labels of the present invention to withstand extended exposure to ice water is determined as follows: about 1 mil of cold glue is applied to the film using a Burd Bar. The labels are laid against a rubber pad and thereafter applied to glass bottles by rolling the bottles over the label. After drying at room temperature for 7 days, the labeled bottles are immersed in ice water, and after 3 days in the ice water, the labels are inspected for adhesion and water whitening.

The results of these tests carried out on some of the films and the labels of the present invention are summarized in Table 2. The results on Comparative Examples 1, 2 and 3, described above, also are included in Table 2. The ratings for adhesion are as follows:

A: no edge lift, good adhesion,
B: slight edge lift, good adhesion on the rest of the area,
C: edge lift and/or weakened adhesion,
D: severe edge lift or label fallout.

The ratings for label whitening after the ice water test are as follows:

A: no whitening visible,
B: slight whitening on the edge and/or seem area,
C: visible whitening on edge and scattered area,
D: visible whitening in large area.

TABLE 2

|  | Glue drying time days | | Iced water test | |
| --- | --- | --- | --- | --- |
|  | at 50% RH | at 70% RH | whitening | adhesion |
| Example 1 | 1 | 2 | B | A |
| Example 2 | 2 | 5 | A | A |
| Example 3 | 2 | 4 | A | A |
| Example 5 | 2 | 5 | B | A |
| Comparative Example 1 | >15 | >15 | C | C |
| Comparative Example 2 | 7 | >10 | C | B |
| Comparative Example 3 | 1 | 2 | D | C |

The results reported in Table 2 demonstrate the improved properties obtained with the styrenic film labels of the invention when compared to the labels of the Comparative Examples.

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

The invention claimed is:

1. A label comprising:
    (A) a polymer film comprising a styrenic polymer, said film having an upper surface and a lower surface, and an MVTR of from about 15 to about 150 g/m²/day, and
    (B) a water-based adhesive in contact with the lower surface of the film.

2. The label of claim 1 wherein the film has an MVTR of from about 15 to about 90 g/m²/day.

3. The label of claim 1 wherein the film comprises a styrene homopolymer.

4. The label of claim 1 wherein the film comprises a styrene copolymer.

5. The label of claim 1 wherein the film also comprises at least one pigment.

6. The label of claim 1 wherein the film is oriented.

7. The label of claim 1 wherein the film is biaxially oriented.

8. The label of claim 1 wherein the film comprises a biaxially oriented polystyrene.

9. The label of claim 1 wherein the upper surface of the film is ink printable.

10. The label of claim 1 wherein the water-based adhesive is based on starch, modified starches, casein, synthetic polymers or blends thereof.

11. The label of claim 1 wherein the film has a Gurley stiffness of from about 5 to about 30 mg in the machine or horizontal direction and a Gurley stiffness of from about 10 to about 40 mg in the cross or vertical direction.

12. The label of claim 1 wherein the film comprises a multilayer film of at least two layers, an upper layer comprising a styrenic polymer and a lower layer having an MVTR which is higher than the MVTR of the upper layer.

13. A label comprising:
    (A) an oriented film comprising a styrenic polymer, said film having an upper surface and a lower surface, and an MVTR of from about 15 to about 90 g/m²/day, and
    (B) a water-based adhesive in contact with the lower surface of the film.

14. The label of claim 13 wherein the film comprises oriented polystyrene.

15. The label of claim 13 wherein the film comprises an oriented styrene copolymer.

16. The label of claim 13 wherein the film is biaxially oriented.

17. The label of claim 13 wherein the film comprises biaxially oriented polystyrene.

18. The label of claim 13 wherein the film also comprises at least one pigment.

19. The label of claim 13 wherein the upper surface of the film is ink printable.

20. The label of claim 13 wherein the MVTR of the film is from about 25 to about 90 g/m²/day.

21. The label of claim 13 wherein the water-based adhesive is based on starch, modified starches, casein, synthetic polymers, or blends thereof.

22. The label of claim 13 wherein the film has a Gurley stiffness of from about 5 to about 30 mg in the machine or horizontal direction and a Gurley stiffness of from about 10 to about 40 mg in the cross or vertical direction.

23. The label of claim 13 wherein the film comprises a multilayer film of at least two layers, an upper layer comprising a styrenic polymer and a lower layer having an MVTR which is higher than the MVTR of the upper layer.

24. A labeling process comprising providing a substrate surface and a label of claim 1, applying the label to the substrate surface with the adhesive of the label in contact with the substrate surface, and allowing the adhesive to dry on the substrate surface.

25. A process for applying a label to a substrate which comprises:
- (A) providing a substrate and a polymer film comprising a styrenic polymer, said film having an upper surface and a lower surface, and an MVTR of from about 15 to about 150 $g/m^2/day$,
- (B) applying a water-based adhesive to the lower surface of the film to form a label,
- (C) applying the label to the substrate with the adhesive of the label in contact with the substrate, and
- (D) drying the water-based adhesive thereby providing an adhesive label on the substrate.

26. The labeling process of claim 24 wherein the substrate is glass, plastic or metal.

27. The labeling process of claim 24 wherein the substrate is a container.

28. The labeling process of claim 24 wherein the container is a glass container.

29. The labeling process of claim 24 wherein the container is a plastic container.

30. The process of claim 25 wherein the substrate is glass, plastic or metal.

31. The process of claim 25 wherein the substrate is a container.

32. The process of claim 31 wherein the container is a glass container.

33. The process of claim 31 wherein the container is a plastic container.

34. The process of claim 25 wherein the water-based adhesive is based on starch, modified starches, caseine, synthetic polymers, or blends thereof.

35. The process of claim 34 wherein the adhesive comprises an emulsion having a solids content of at least about 40% by weight.

36. The process of claim 31 wherein the container is a container for food, drink or a household product.

* * * * *